United States Patent
Margalit

(10) Patent No.: US 11,386,234 B2
(45) Date of Patent: Jul. 12, 2022

(54) SECURITY SYSTEMS AND METHODS FOR INTEGRATED CIRCUITS

(71) Applicant: NUVOTON TECHNOLOGY CORPORATION, Hsinchu Science Park (TW)

(72) Inventor: Ilan Margalit, Tel-Aviv (IL)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 322 days.

(21) Appl. No.: 16/717,473

(22) Filed: Dec. 17, 2019

(65) Prior Publication Data

US 2021/0182432 A1    Jun. 17, 2021

(51) Int. Cl.
  *G06F 21/64*  (2013.01)
  *G06F 1/24*  (2006.01)
  *G06F 21/55*  (2013.01)
  *G11C 29/04*  (2006.01)

(52) U.S. Cl.
  CPC ........... *G06F 21/64* (2013.01); *G06F 1/24* (2013.01); *G06F 21/552* (2013.01); *G06F 2221/032* (2013.01)

(58) Field of Classification Search
  CPC .......... G06F 21/64; G06F 1/24; G06F 21/552; G06F 2221/032; G11C 29/04; G11C 2029/0405; G11C 2029/0411
  See application file for complete search history.

(56) References Cited

U.S. PATENT DOCUMENTS

| | | | |
|---|---|---|---|
| 6,968,460 B1 * | 11/2005 | Gulick | G06F 7/58 708/250 |
| 8,146,028 B1 | 3/2012 | Lesea | |
| 8,341,473 B2 | 12/2012 | Bertacco et al. | |
| 10,116,436 B1 * | 10/2018 | Kodalapura | G06F 21/564 |
| 2003/0188113 A1 * | 10/2003 | Grawrock | G06F 21/57 711/156 |
| 2004/0003288 A1 * | 1/2004 | Wiseman | G06F 21/71 726/30 |
| 2005/0089160 A1 * | 4/2005 | Crispin | G06F 9/30065 380/28 |
| 2008/0083039 A1 * | 4/2008 | Choi | H04L 9/3234 726/27 |

(Continued)

OTHER PUBLICATIONS

"Register File;" Wikipedia; Oct. 27, 2019; https://en.wikipedia.org/wiki/Register_file.

*Primary Examiner* — Darren B Schwartz
(74) *Attorney, Agent, or Firm* — Oliff PLC

(57) ABSTRACT

A system for verifying integrity of content of an integrated circuit's registers, the system being operative in conjunction with an integrated circuit including at least one memory, at least one processor, and a multiplicity of registers, the system comprising register content verification logic configured, when in a first mode aka "Study Mode", to read at least some of the registers' content, to compute a first hash on the content, and to store the first hash thereby to provide an up-to-date reference hash, and, at least on occasion, when in a second mode aka "Verify Mode", to compute at least one second hash on the content, to compare the second hash to the reference hash and, accordingly, to provide a content verification output (aka "fault detection" output) indicative of whether the reference and second hashes are equal.

16 Claims, 2 Drawing Sheets

(56) References Cited

U.S. PATENT DOCUMENTS

| | | | |
|---|---|---|---|
| 2008/0229055 A1* | 9/2008 | Craft | G06F 21/57 |
| | | | 711/216 |
| 2009/0070598 A1* | 3/2009 | Cromer | G06F 21/575 |
| | | | 713/193 |
| 2009/0259854 A1* | 10/2009 | Cox | G09G 5/001 |
| | | | 713/189 |
| 2010/0281273 A1* | 11/2010 | Lee | F04B 33/00 |
| | | | 713/193 |
| 2011/0078408 A1* | 3/2011 | Ishida | G06F 21/572 |
| | | | 711/216 |
| 2013/0191624 A1* | 7/2013 | Jarmay | G06F 9/4401 |
| | | | 713/2 |
| 2015/0074384 A1* | 3/2015 | Yajima | G06F 21/575 |
| | | | 713/2 |
| 2015/0074425 A1* | 3/2015 | Griffes | G06F 21/79 |
| | | | 713/193 |
| 2017/0168902 A1* | 6/2017 | Branco | G06F 21/74 |

* cited by examiner

Fig. 2 a. design integrated circuit to support operations b - e
↓
b. register/s of integrated circuit are conventionally initialized
↓
c. state machine activates "Study Mode" and stores snapshots or expected digests, ypically restarting or beginning anew operation c if a legit write occurs during operation c
↓
d. when all registers are digested, the state machine switches to "Verify Mode" to perform the following verification (digest/compare) cycle:
cycle operation I: digest current contents of register/s
cycle operation II: compare the contents digested in operation I, to expected digests obtained during "Study Mode" (e.g. as activated in operation c), thereby to verify (or not) the digested contents.
↓
e. if legit writes occurred during cycle operation I of operation d, return to operation c. otherwise or if no legit writes occurred during cycle operation I of operation d, return to cycle operation I, typically immediately

SECURITY SYSTEMS AND METHODS FOR INTEGRATED CIRCUITS

The disclosure relates to maintaining integrity of content stored on integrated circuits.

BACKGROUND FOR THIS DISCLOSURE

Verification of an integrated circuit's memory content, aka memory protection, error detection, or error correction, is recognized as an important objective. Therefore, an integrated circuit may include a memory array and on-the-fly memory error detection/correction functionality e.g. parity or error correction code (ECC) circuitry. However ECC is very costly for large memories, and it is not as strong as cryptographic memory verification. Thus cryptographic memory verification is typically achieved using what may be termed as digest-redo-compare technology, implemented e.g. in firmware or dedicated hardware, in which memory content may be digested once to generate a reference. Then the digest is redone on occasion e.g. periodically, and each time a comparison is performed to verify that the new digest is the same as the reference digest. For example, memory space may be divided or partitioned into plural "chunks". A processor then computes and stores a hash for each chunk, typically storing a secret key on-chip. When the processor reads a block from chunk C in memory, the processor may read or load the entire chunk C, re-compute the hash of the loaded chunk, and compare the newly recomputed hash with the hash stored in memory for chunk C. If the comparison yields no difference, all is well, whereas if the newly recomputed hash differs from the stored hash, assuming that the physical and electrical integrity of the memory array is known to be intact, this indicates that the memory content has been tampered with.

Conventional register doubling/duplication, which is an existing register content verification method, is described in U.S. Pat. No. 8,146,028. Typically, given a register comprising plural flip-flops combined in parallel, this is believed to include doubling of a register's flip-flops to yield plural flip-flops, maintaining all of the plural flip-flops, and, on occasion, or periodically, e.g. continuously, comparing the values between the plural flip-flops, to detect mismatches between duplicated instances which, if detected, are indicative of tampering. Typically, when doubling is implemented, there is no dependency or interlink between registers since each register has its own shadow and comparison logic.

Integrity checks of logical elements (but not of content thereof), which may be used in conjunction with any embodiments shown and described herein, are described in U.S. Pat. No. 8,341,473 to Bertacco. Bertacco https://patents.google.com/patent/U.S. Pat. No. 8,341,473B2/en, describes a method by which "register file integrity may be checked using a four phase split-transaction test procedure".

SUMMARY OF CERTAIN EMBODIMENTS

Improving the security of integrated circuits is a constant concern in the integrated circuit industry. One way to improve security, is to better secure the contents of registers on the integrated circuit. Securing the contents of registers typically assures that, other than intentional modifications, register contents remain intact throughout the period of normal operation of the device in which the registers reside.

Certain embodiments seek to provide a system or method configured for maintaining integrity of configuration and/or control settings of integrated circuits.

Certain embodiments seek to provide a system or method configured for checking integrity of content of at least one register aboard an integrated circuit.

Verification of an integrated circuit's register content, as an objective, has—to put it kindly—received considerably less emphasis in the literature, than has verification of an integrated circuit's memory content, which is a very well recognized objective. When register content verification is discussed at all, it is typically achieved by doubling e.g. Duplicating. A few registers (from among thousands that may be provided on modern integrated circuits, and the number is growing) may be deemed to need content verification, and dedicated protection hardware may then be implemented for those registers accordingly.

Certain embodiments herein seek to provide broad protection (content verification) for large numbers of registers e.g. for all of the thousands of registers that may be provided on modern integrated circuits.

Certain embodiments herein seek to provide digest-based register-content integrity verification which is more efficient in terms of die area (requires less die area) when a few thousand registers or more are present on an integrated circuit.

Certain embodiments seek to provide hardware which performs integrity checks for contents of an integrated circuit's registers (e.g. register file/s), in a manner which is transparent to, or does not disrupt, the regular functionality of the integrated circuit. Hashes may be computed for IC memory content verification, using logic implemented in HW, SW or FW, typically depending on a designer's choice of the easiest option or the option least costly in terms of hardware. Computation of hashes may be performed similarly or identically when verifying memory content and when verifying register content, however, typically, memory cannot be used or accessed while a hash thereof is being computed, whereas registers values may be obtained without causing any interruptions.

The following terms may be construed either in accordance with any definition thereof appearing in the prior art literature or in accordance with the specification, or to include in their respective scopes, the following:

Register file: typically is intended to include a set of multiple registers aboard a single integrated circuit. Conventional register files are described in Wikipedia's entry on "register file". According to an embodiment, an integrated circuit includes one or more register files, and one digest is computed for all registers in a given register file, or set of register files. According to an embodiment, an integrated circuit includes one or more register banks, and one digest is computed for all registers in a given register bank, or set of register banks. However, it is appreciated that the Register file referred to in FIG. 1 and elsewhere herein is intended to include at least one file or more generally, any multiplicity of registers aboard a single integrated circuit e.g. a "register bank" which includes plural register files, or any other group of registers.

Auth: intended to include a digest.

"digest" aka "digest function": computational algorithm or logic that maps data of arbitrary size to a bit string of a fixed size; this bit string which is an output of a digest function is sometimes termed "the digest". The term digest as used herein includes cryptographic digests in which the data is mapped by a crypto function such as a cryptographic hash function. However, not all digests are cryptographic, and, more generally, any suitable digest may be employed, depending e.g. on the strength preferred by the designers of the IC. For example, a digest may comprise a checksum digest, in which case the data is typically mapped by a fixed-size sum.

snapshot: hash of current content of an integrated circuit's register/s, which is stored aboard the integrated circuit. Typically, the hashes stored as snapshots are not time-stamped, since it is typically sufficient to know only that the stored hash is the most recent. There can be one or more currently valid snapshots, e.g. depending on whether one full digest is stored, or whether several partial digests are stored as per the stepwise embodiment described herein.

There are thus provided at least the following embodiments:

Embodiment 1. A system for verifying integrity of content of an integrated circuit's registers, the system typically operative in conjunction with an integrated circuit including at least one memory and/or at least one processor and/or a multiplicity of registers, the system comprising: register content verification logic configured, e.g. when or only when in a first mode aka "Study Mode", to read at least some of the registers' content and/or to compute a first auth or digest e.g. hash on the content, and/or to store the first hash thereby to provide an up-to-date reference hash, and, at least on occasion, when in or only when in a second mode aka "Verify Mode", to compute at least one second auth or digest e.g. hash on the content and/or to compare the second hash to the reference hash and, accordingly, to provide a content verification output (aka "fault detection" output) typically indicative of whether the reference and second hashes are equal.

Typically, a fault is detected when the two hashes are not equal.

The content verification output (aka "fault detection" output) (e.g. as shown in FIG. 1) typically comprises an indication that the two hashes are not equal and may be received by hardware which may, responsively, perform certain action/s. And/or, the "fault detection" output may comprise a flag/interrupt raised to firmware which may, responsively, trigger (or give a command to perform) certain action/s. Any suitable action/s may be performed, by hardware and/or by firmware, responsive to the "fault detection" output, such as but not limited to reset and restart, halt until power is cycled, halt forever.

A particular advantage of register content verification as described herein is that registers as opposed to memory are always available for obtaining their values (in order to digest and compare them). The interface to the register does not need to be "owned", or taken over, in order to discern the register's content for digest/compare purposes. In contrast, when conventionally verifying memory content, the memory's normal operation is disrupted as the memory is arbitrated to or taken over for the memory content verification, verified and then released, and once the memory is taken over, the memory becomes unusable for any other operation, until release.

Another particular advantage of embodiments herein is in overcoming the problem that doubling, as is known in the art, was mainly practical for register content verification which only sought to protect a small number of registers. This modest objective could have been either because only a subset of the registers on board the integrated circuit was, rightly or wrongly, regarded as needing protection and/or because only a small number of registers were present on the integrated circuit in the first place—as was the case for earlier integrated circuits but increasingly is no longer the case. Thus, for whatever reason, the overhead generated by use of doubling for register content verification was, historically, not large. Currently, it is believed that many or most integrated circuits would benefit from protection of thousands of registers, but providing this protection by using conventional doubling would cause large overhead even today, and this overhead may be expected to become larger, as integrated circuits are designed to include more and more registers. Thus, while doubling may have been efficient enough when each integrated circuit included only a few registers, this is becoming less and less satisfactory the more registers each integrated circuit is designed to have, and indeed the number of registers per chip keeps growing. Embodiments shown and described herein provide a greater degree of efficiency.

It is appreciated that embodiments herein add less cells than doubling, assuming that a relatively large number of flip-flops are present, in practice.

It is appreciated that as soon as an integrated circuit has a certain number of registers, the system herein becomes cost effective: implementing digest and verification logic on that integrated circuit becomes justified (becomes more efficient than using doubling) because once that certain number of registers is exceeded, digesting becomes more efficient than doubling e.g. because doubling requires logic to compare each pair, to ensure each pair is identical; this logic is not needed/is obviated in the digest and verification logic described herein.

The number of registers which renders the system cost effective is present even in today's integrated circuits, not to speak of the fact that the number of registers per integrated circuit has been tending to increase over the years.

Typically, the first hash and the second hash each comprise a single hash from the following group: MD5, SHA-1, SHA-2, NTLM, and LANMAN.MD. Typically, the first and second hash must be computed using the same algorithm, otherwise there will be no meaning to comparing the first and second hashes (no basis for comparison).

Embodiment 2. The system of any of the preceding embodiments wherein if a legitimate modification of register content (aka register value modification) occurs while the logic is in the Study Mode, operation of the Study Mode is arrested and is re-started when the modification is over, including replacing any reference hash previously stored with a newly computed first hash.

Any register write (e.g. to a "surveilled register") may be considered a legitimate register modification—which then facilitates detection or prevention of hardware tampering by embodiments herein—whereas malicious firmware writing a register may not be detectable if the write is considered legit.

Any suitable method may be employed by the logic herein, to determine when a legitimate register modification is over, at which point in time the logic may switch modes and compute a new hash/digest. For example, a register write typically requires a known maximum number of IC clock cycles, c. Thus, the logic may count c clocks and then the logic may safely (assume that the register now holds the new value and) compute a new hash/digest.

Embodiment 3. The system of any of the preceding embodiments wherein if a legitimate modification of register content occurs while the logic is not in the Study Mode, the logic activates the Study Mode after the modification is over and before activating the Verify Mode.

Embodiment 4. The system of any of the preceding embodiments wherein if a legitimate modification of register content occurs while the logic is in the Verify Mode, operation of the Verify Mode is arrested, and when the modification is over, the logic reverts to Study Mode before returning to Verify Mode.

Embodiment 5. A method for checking integrity of contents of at least one register, the method comprising: at least once, performing a cycle including the following operations: digesting the contents of (aka values in) at least one register, thereby to generate a digest; and verifying integrity of the contents by comparing the digest to a reference.

Embodiment 6. The system of any of the preceding embodiments wherein when the logic is in the Verify Mode, registers are continuously hashed and compared, thereby to provide frequent content verification outputs, yielding a high degree of security.

Embodiment 7. The system of any of the preceding embodiments wherein each time the reference and second hashes are not equal, the content verification output causes at least one action to be performed by being received by at least one of:

firmware which, responsively, triggers the action; and
hardware which performs the action.

Embodiment 8. The system of any of the preceding embodiments wherein the action comprises resetting a device incorporating the integrated circuit.

Embodiment 9. The system of any of the preceding embodiments wherein if the reference and second hashes are not equal, the content verification output may comprise a flag/interrupt raised to firmware which is operative to warn higher levels of software that the system incorporating the integrated circuit system may be under hacking attack.

Embodiment 10. The system of any of the preceding embodiments wherein the action comprises a complete hardware reset for all of the integrated circuit's hardware.

This command may be "hardware to hardware". Typically, a signal in the hardware triggers a complete or partial/selective IC reset.

Embodiment 11. The system of any of the preceding embodiments wherein the action comprises a system reset, e.g. re-init.

Embodiment 12. The system of any of the preceding embodiments wherein the action comprises halting a device incorporating the integrated circuit until the device has been powered off and switched back on.

Alternatively or in addition to embodiments 7-12, the logic may trigger a suitable output message to a human engineer, recommending that the IC should be halted forever or retired. The logic may assert some output signal, or may respond to some access in a manner indicative of being in such a halt state.

Embodiment 13. The method of any of the preceding embodiments wherein the reference comprises a digest previously computed at a time t by digesting the contents present in the at least one register at time t.

Embodiment 14. The system of any of the preceding embodiments wherein each of the hashes is computed over a set of registers including plural registers.

Embodiment 15. The system of any of the preceding embodiments wherein the integrated circuit includes one or more register files, and wherein each of the hashes is computed over all registers in a given register file.

Embodiment 16. The system of any of the preceding embodiments wherein the integrated circuit includes one or more register banks, and wherein each of the hashes is computed over all registers in a given register bank.

Embodiment 17. The system of any of the preceding embodiments and also comprising an integrated circuit including a multiplicity of registers; and wherein the register content verification logic is deployed aboard the integrated circuit.

Embodiment 18. The method of any of the preceding embodiments wherein the at least one register comprises at least one register file.

Embodiment 19. The method of any of the preceding embodiments wherein the digest comprises a hash.

Embodiment 20. The system of any of the preceding embodiments wherein the integrated circuit includes a processor having a first entry point including a first command to be executed after reset, and wherein, if the reference and second hashes are not equal, the content verification output triggers a hardware reset signal which causes the processor to revert to the first entry point.

Embodiment 21. The system of any of the preceding embodiments wherein the logic is implemented in hardware residing on the integrated circuit.

Embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate array (FPGA), application specific integrated circuit (ASIC), etc.) and other electronic computing devices.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

BRIEF DESCRIPTION OF THE DRAWINGS

FIG. 2 is a simplified flowchart illustration of a method in accordance with certain embodiments; all or any subset of the illustrated operations may be provided, suitably ordered e.g. as shown.

Figure 1:
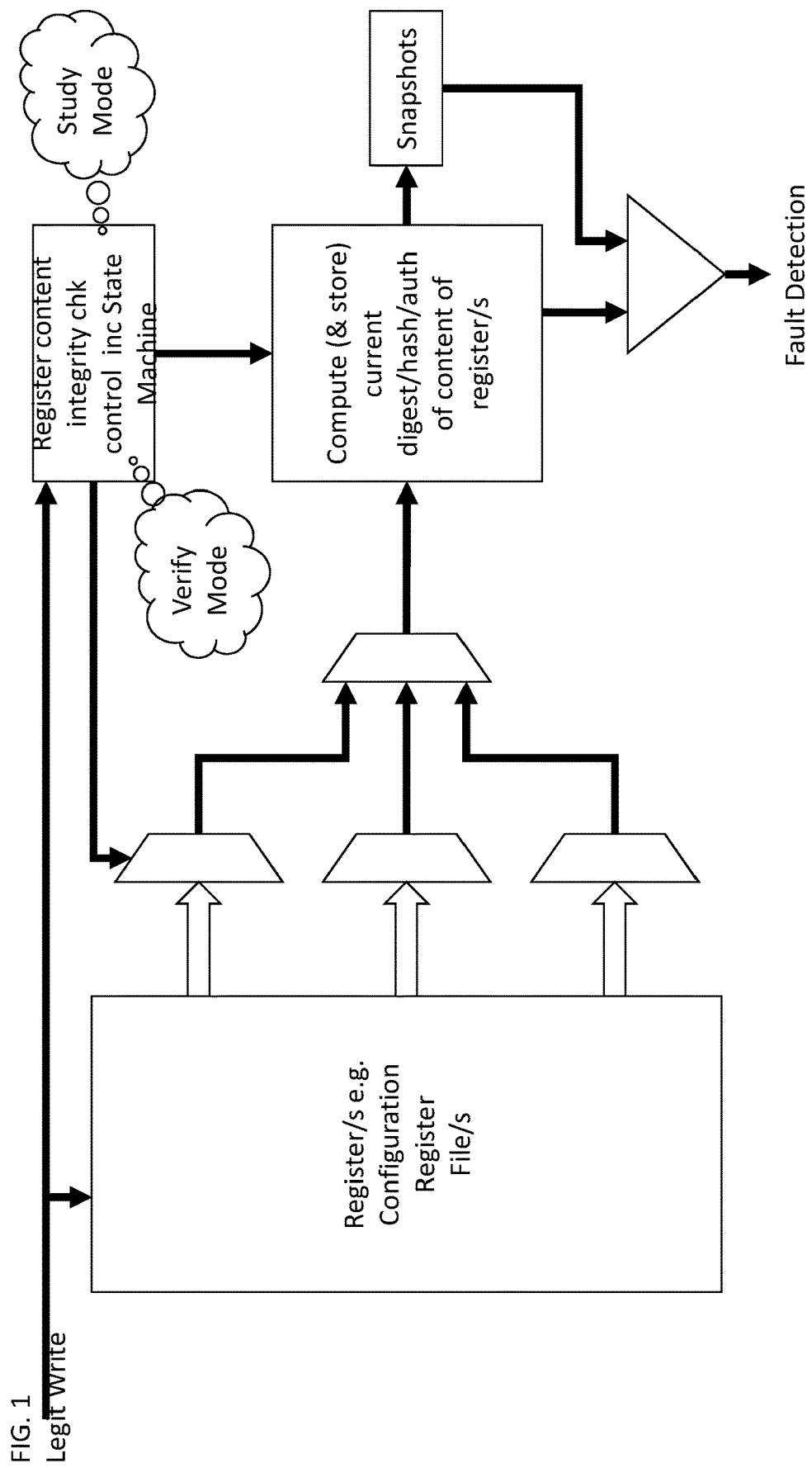
FIG. 1 is a simplified block diagram of a system in accordance with certain embodiments; all or any subset of the illustrated blocks may be provided, suitably inter-related e.g. as shown.

It is appreciated that elements illustrated in different drawings, and/or elements in the written description may still be combined into a single embodiment, except if otherwise specifically clarified herein.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Any logical functionality described herein may be implemented as a real time application, if and as appropriate, and which may employ any suitable architectural option such as but not limited to ASIC or DSP or any suitable combination thereof. Any hardware component mentioned herein may in fact include either one or more hardware devices e.g. chips, which may be co-located or remote from one another.

DETAILED DESCRIPTION OF CERTAIN EMBODIMENTS

Auth is frequently applied to code and/or chunks of data retained in storage, e.g. memory. Typically, this memory requires designated access for reading. Registers in an integrated circuit, e.g. configuration/control registers, normally store configuration and/or control settings for the integrated circuit. Thus, an integrated circuit's Registers normally configure and control the IC, e.g. by setting various modes of the integrated circuit's operations e.g. how the IC is to perform various functionalities. Examples of IC configuration include, say, setting of clock frequency, enabling/disabling certain functions, selecting the function of IO terminals, etc. Thus, a hacker might be motivated to hack configuration/control registers to be able to steal data, and/or cause the IC or a device in which the IC is embedded, to malfunction. Configuration and control registers are typically highly distributed, occurring in a multiplicity of logical chunks respectively coupled to a multiplicity of different logical functions/blocks.

Certain embodiments are operative for applying auth to registers.

According to certain embodiments, content verification for registers is provided using a method which conventionally has been used to provide content verification for memory, including digesting content once to generate reference, and then redoing digest periodically to yield a new digest, and, each such cycle, verifying that the new digest is the same as the reference digest. For example, apparatus may be provided for checking integrity of contents of at least one register file, and the apparatus may be configured to, at least once, perform a cycle including the following operations: digest the contents of (aka values in) the register file, thereby to generate a digest, and verify the digest.

Obtaining registers's contents does not normally require designated access unlike reading memory, which does normally require designated access. The configuration and control setting values stored in registers are typically available or "exposed" for surrounding IC hardware to view and/or utilize, at the discretion of the designer of the surrounding hardware. This is typically because, while registers may refer to any physical structure used for storage, more typically, each register comprises plural flip-flops combined in parallel, each of which has/have an output, which is always normally "available" for any surrounding hardware to use. In contrast, standard memory is structured in a way that requires a transaction to be conducted, typically both in terms of functional requirements, as well as a condition for eligibility or authorization to obtain a value stored in a given memory cell.

It is appreciated that digesting a register file, e.g. as described herein, is time consuming, and constant digesting would be impractical. However, it is appreciated that constant digesting would not normally be needed, because register files, e.g. those of configuration and control registers, are normally more static than memory. Relative to memory, configuration and control registers are typically changed infrequently if at all, once they have been initialized after reset. Since changes to register content are rare or even non-existent, the file may be probed (its content may be verified including digestion as described herein) relatively infrequently; as opposed to the case of rapid changes, more characteristic of memory, which would necessitate following changes all the time, which might render the digesting herein impractical. Since hacking may take place at any time, frequency of probing may be set at the discretion of the engineer handling integrated circuit security issues Reference is now made to FIG. 1 which is a simplified block diagram of an embodiment of the invention; all or any subset of the illustrated blocks may be provided. The apparatus of FIG. 1 is typically all deployed aboard a single integrated circuit. The apparatus of FIG. 1 typically includes a Register content integrity check control, implemented in hardware or firmware/software, for continuous (typically) integrity checks for register file contents.

The Register content integrity check control may for example cycle over register/s e.g. register file/s, which are typically (assumed to be) mostly static, e.g. initialized after reset, then retained mostly unchanged thereafter. In each cycle, the Register content integrity check control of FIG. 1 typically digests the contents, and verifies the digest of the values in the registers typically without interrupting the regular operation of the device. The apparatus of FIG. 1 includes a Register content integrity check control which typically includes a Register content integrity check control, which performs integrity checks for register file contents and may for example reside in hardware.

Alternatively, or in addition, the Register content integrity check control of FIG. 1 may be implemented in software or in firmware e.g. by reading all relevant registers and digesting/authenticating them, using software or firmware respectively. This is suitable if these operations would not unduly burden the performance of the subject system e.g. integrated circuit.

A particular advantage of hardware implementation is that buses and register access paths need not be tied up or occupied for the purpose of Register content integrity check control, and instead may continue their normal operation undisturbed or uninterrupted. For example, hardware implementation avoids any need to access each register through IC buses. This is advantageous because if registers are accessed through IC buses, other functions served by those IC buses may be at least partly disrupted e.g. delayed, which may adversely affect the total IC functionality to which the other functions served by these IC buses contribute.

Typically, flop outputs (e.g. the logical signals exiting the parallel flipflops within registers being protected) are routed to any suitable additional destination. Examples:
1. Perhaps the destination comprises a given IC "block", whose block may be, say, enabled when the arriving signal is '1' and disabled when the arriving signal is '0', or, a destination [I suggest revisiting the wording of this example].
2. Perhaps the destination comprises logic which selects, say, which clock is to be used, where the logic is configured to either select clock A (say, when the arriving signal is '1') or block B (when the arriving signal is '0').

Thus, the die area dedicated to registers may increase, due to addition of digest functionality and/or due to additional routing provided for this purpose.

In FIG. 1, the 4 trapezoids denote respective decoders/multiplexers provided in accordance with certain embodiments, which collect inputs from plural registers and pass on a subset based on control signals. For example, the outputs of plural registers may pass through a set of selectors and decoders to yield a subset of the bits stored in the register, whose subset, unlike the bits which are not stored in that register, is of interest.

FIG. 2 illustrates a register content integrity verification method which may include all or any subset of the following operations, suitably ordered e.g. as follows:

a. design phase: the designer of the IC ensures the IC is structured to enable the embodiments herein. Typically, during the design phase, a certain set of registers, from among the registers aboard the integrated circuit, is selected. Selection typically occurs during the design phase, by deciding which set of registers, e.g. perhaps all registers aboard the integrated circuit, or, alternatively, perhaps only a certain subset of the registers aboard the integrated circuit, is to undergo integrity monitoring by the integrity check functionality shown and described herein.

This set may comprise a set for which it is particularly important to monitor the integrity of the data, e.g. identify any unwanted alteration by external hardware.

The registers illustrated in the apparatus of FIG. 1 are intended to represent this set.

Also, the designer may select a single hashing method (e.g. just one of the following: MD5, SHA-1, SHA-2, NTLM, and LANMAN.MD) in the design phase and may include only one type of engine on the integrated circuit (only an engine which executes this selected hashing method), since each additional engine would engender unnecessary costs in terms of die area.

Following the design phase, normal operation may commence, e.g. for the apparatus of FIG. 1, and the method of operation may include all or any subset of the operations below.

a. The register/s are reset, e.g. are brought to certain, fixed default values by IC hardware.

b. The register/s are initialized typically as part of the normal sequence of events constituting the regular operation of the IC. This register initialization is typically carried out by firmware.

c. the apparatus of FIG. 1 (e.g. the Register content integrity check control of FIG. 1) is enabled. The state machine of FIG. 1's Register content integrity check control initially places the system in "Study Mode".

In Study Mode, the system captures register values from the register/s e.g. register file and digests or hashes (or applies any other auth to) the captured register values, using suitable digest functionality e.g. as shown in FIG. 1, which may be implemented in hardware or firmware/software, thereby to yield expected values aka expected digests which may be stored in "snapshots" e.g. as shown in FIG. 1.

If at any point during Study Mode, an indication (aka "legit write") is received by the system's state machine, that a legitimate register value modification is ongoing, the state machine arrests operation of the system of FIG. 1, and, e.g. after waiting a suitable number of clock cycles sufficient to ensure that the modification is now complete, starts the study process again, re-capturing the registers to produce updated digests.

the "legit write" typically originates from the main processor of the IC and typically combines write indications for all protected registers.

Typically, when the integrated circuit's main processor (say) issues a register write, the processor typically submits a set of address and data, which are then accompanied by a control signal indicating a write transaction. The address is then decoded for IC logic to determine a register to be written.

Thus the indication received by the system's state machine may comprise a logical combination of a valid target address being decoded to point to a register within a register file which may be monitored or protected as described herein, combined with a control signal indicating a write transaction.

The indication typically comprises an indication that a conventional integrated circuit implements for use in carrying out register write.

When re-capturing, typically, the order of capturing the registers varies such that it will not be possible to time an attack in both "Study Mode" and "Verify Mode". It is appreciated that digesting may be regarded as involving sequentially processing, or "summing up", binary values. Typically, processing is done in a different order, or the "sums" are "summed" in a different order, each time digesting is done e.g. each cycle. To give a simplified example, perhaps a certain integrated circuit has but 3 registers—A, B and C. So, when digesting these registers a first time e.g. in a cycle n, the following order may be followed: A then C then B, i.e. first digest register A, then C, then B. The next time, e.g. in cycle n+1, the order may be C then A then B i.e. digest register C first, followed by A and then B. The next time, the order of digesting may be B, then C, then A, and so forth. The order in which registers are digested in each cycle, may for example be randomly determined e.g. by the state machine of FIG. 1, or may follow a set pattern which may be stored e.g. in the state machine of FIG. 1. For example, if one cycle uses A then C then B, the next cycle always uses C then A, then B, the next uses B, then C, then A, and the next cycle goes back to using A, then C, then B, and so forth.

This is advantageous because if the order of capturing the registers varies, it becomes difficult or impossible to time an attack on the integrity check functionality shown and described herein. This is because a successful attack typically would need to attack the same register during both the study phase when the Study Mode is active, and during the verification phase, during which "Verify Mode", e.g. as described below with reference to operation d, is active.

If each cycle always uses registers in the same order each time, it is easier to tell which register is being digested at any time and/or to time the attack correctly, accordingly. In contrast, if different orders are used in different cycles, e.g. as described above, it becomes far more difficult, or even impossible, to time a successful attack.

d. When all registers are digested, the state machine switches the system of FIG. 1 to "Verify Mode" in which the Register content integrity check control of FIG. 1, at least once and typically plural times e.g. Continuously, performs the following verification cycle:

Cycle operation i: use the digest functionality of FIG. 1, to digest the contents of the register/s of FIG. 1, and Cycle operation ii: compare the digested contents to the expected digests (aka "snapshots") obtained during "Study Mode", thereby to verify (or not) the digested contents.

Regarding cycle operation I, any suitable digest such as, say MD5, SHA-1, SHA-2, NTLM, and LANMAN.MD may be employed to digest register contents in cycle operation I (and the same digest may be used to recompute a digest each time a change in a relevant register value revokes a current digest).

Typically, a single digest is computed for the contents of many registers, rather than computing one such digest for each register. The breakeven point is typically a few thousand register bits. In other words, the integrity check by digest method shown and described herein becomes more efficient than doubling, in terms of die area, at a "break-even point" of, say, few thousand register bits. It is appreciated that even today, many or most conventional integrated circuits have at least 1K registers (i.e. 8K register bits) and sometimes even more. To compute the break-even point, consider an example digest such as SHA1 and determine how many logic cells implementation may require e.g. as is conventional, synthesize the logic making the digest engine, thereby to determine the number of cells that are needed to implement the integrity check by the digest method shown and described herein in hardware.

the synthesis operation may for example be performed by EDA tools, and may include taking logic equations in RTL and incorporating them into logic gates of a suitable VLSI technology, which can then be placed in IC layout and manufactured.

The number of cells, e.g. perhaps 5,000 logic cells, may be taken to be the range for the number of register bits which would justify the integrity check by digest method shown and described herein, relative to duplication. This yields the break-even number of registers (e.g. 5k register bits corresponds to 5k/8 registers assuming 8 registers per bit). It is appreciated that the break-even point depends inter alia on the number of registers for which a single digest is computed. If the digest is computed for more registers, more hardware is required to compute the digest, which increases the break-even point. In cycle operation II, verification of a digest of certain register content (aka the register content's "reference digest result") typically comprises re-digesting the same register content, thereby to yield a second digest result, and comparing the second digest result to the reference digest result; if there is no difference, the digest is considered to have been "verified". As described, If at any point during any study or verification, an indication is received for legitimate register value modification, aka "legit write", the Register content integrity check control logic of FIG. 1 arrests verification and reverts to Study Mode, thereby to re-capture the registers to yield updated expected values, aka expected digests. Typically, at this point, out-of-date expected digests aka snapshot/s, stored previously, are discarded e.g. are replaced with the newly updated expected digests.

It is appreciated that the above operations B, C, D, I, II need not necessarily all be performed each time this method is performed. for example, the method described herein may be performed each time, or some of the times, that the IC is started. When that occurs, registers may be initialized (once; initialization may recur if the IC is reset or restarted, in which case, typically, the method goes back to the very beginning). Study Mode, in which the digest is computed, typically is entered subsequently (after register initialization). The mode of operation may then switch to Verify Mode. The digest may then be recomputed once in a while or periodically or continuously and compared, typically each time, to the original digest. This may go on forever e.g. until arrested by an event such as: an error is detected (e.g. because the recomputed-original digest comparison fails), or a monitored register is written (in which case the mode of operation typically reverts to Study Mode to digest again), or power goes off or the IC is reset, in which cases typically the method reverts to reset and initialization.

The speed and/or periodicity and/or frequency of repetition of the Register content integrity check control logic of FIG. 1 (e.g. of the above method of operation) is typically determined irrespective of normal IC activities, so verification cycles could occur at any speed or periodicity, typically depending on designer considerations regarding security and power consumption. According to an embodiment, registers are continuously scanned and digested, and the digest is thus very frequently compared to a suitable reference. But if less security is considered sufficient and/or power consumption is an important design consideration, the scanning, digesting and comparing need not be performed continuously, and may, instead, be performed less frequently e.g. only on occasion e.g. periodically. There is a trade-off between consumption of power by the integrity check hardware (e.g. by all elements in FIG. 1 other than the register file itself) and register content security. Thus, to the extent security is more important and power consumption less so, scanning, digesting and comparing are performed frequently, whereas in use cases in which security is less important and power consumption more so, scanning, digesting and comparing are performed more infrequently.

Stepping Aka Stepwise Integrity Checks

According to certain embodiments, integrity checks are performed in, or batched into, plural steps, rather than all at once. Consider an integrated circuit having, say, N=500 registers aboard. According to certain embodiments, the registers may be partitioned or split into, say, S=5 sets or sections and a digest may be computed and kept (e.g. as a snapshot) not for each register but instead, for each set of N:S=100 registers. This way one is likely to know earlier (after only some, rather than all, of the plural steps have been performed) if a certain register was corrupted. Typically, for each s, the digest computed for section s (s=1 . . . S) is compared to a previously stored digest of section s, before (and typically as a condition for) computing the digest for section s+1. Typically, the stepwise embodiment makes it possible to detect earlier (relative to a non-stepwise embodiment) that that a register has been corrupted, which is advantageous inter alia because this eliminates the need to perform remaining steps from among the plural steps (if the register corrupted is included in a section other than the last section). For example, if the digest for the very first section fails (is found upon comparison not to equal a previously stored digest of the first section), then it is no longer necessary to compute the digests for the second, third, and fourth sections.

Each element described herein may have all attributes described or illustrated herein, or, according to other embodiments, may have any subset of the attributes described herein.

Firmware, if used to implement certain embodiments herein, may be held in non-volatile memory, e.g. Flash or ROM.

Alternatively, certain embodiments described herein may be implemented partly or exclusively (i.e. without firmware) in hardware in which case some or all of the variables, parameters, sequential operations and computations described herein may be in hardware.

It is appreciated that terminology such as "mandatory", "required", "need" and "must" refer to implementation choices made within the context of a particular implementation or application described herewithin for clarity and are not intended to be limiting, since, in an alternative implementation, the same elements might be defined as not mandatory and not required, or might even be eliminated altogether.

A system embodiment is intended to include a corresponding process embodiment and vice versa. Features may also be combined with features known in the art and particularly, although not limited to those described in the Background section or in publications mentioned therein.

It is appreciated that any features, properties, logic, modules, blocks, operations or functionalities described herein which are, for clarity, described in the context of separate embodiments, may also be provided in combination in a single embodiment except where the specification or general knowledge specifically indicates that certain teachings are mutually contradictory and cannot be combined. Any of the systems shown and described herein may be used to implement or may be combined with, any of the operations or methods shown and described herein.

Conversely, any modules, blocks, operations or functionalities described herein, which are, for brevity, described in the context of a single embodiment, may also be provided separately or in any suitable sub-combination including with features known in the art (particularly although not limited to those described in the Background section or in publications mentioned therein) or in a different order.

"e.g." is used to denote an example, and is not intended to be limiting. Each method may comprise some or all of the operations illustrated or described, suitably ordered e.g. as illustrated or described herein.

The invention claimed is:

1. A system for verifying integrity of content, the system being operative in conjunction with an integrated circuit including at least one memory and a multiplicity of registers, the system comprising:
   register content verification logic configured for:
      when in a Study Mode, reading content from at least some of the multiplicity of registers, in said integrated circuit, which configure and control the integrated circuit, for computing a first hash on said content, and for storing said first hash thereby to provide an up-to-date reference hash, and,
      at least once, when in a Verify Mode, verifying the integrity of at least some of the integrated circuit's registers for computing at least one second hash on said content, for comparing said at least one second hash to said reference hash and, accordingly, for providing a content verification output indicative of whether said reference hash and said at least one second hash are equal,
   wherein each time the reference and second hashes are not equal, the content verification output causes at least one action to be performed by being received by at least one of:
      firmware which, responsively, triggers said least one action; and
      hardware which performs said least one action,
   wherein said action comprises halting a device incorporating the integrated circuit until the device has been powered off and switched back on.

2. The system of claim 1 wherein if a legitimate register value modification occurs while said logic is in said Study Mode, operation of said Study Mode is arrested and is re-started when said modification is over, including replacing up-to-date reference hash, as previously stored, with a newly computed first hash.

3. The system of claim 1 wherein if a legitimate modification of content of at least one of said multiplicity of registers occurs while said logic is not in said Study Mode, said logic activates said Study Mode after said modification is over and before activating said Verify Mode.

4. The system of claim 1 wherein if a legitimate modification of content of at least one of said multiplicity of registers occurs while said logic is in said Verify Mode, operation of said Verify Mode is arrested, and when said modification is over, said logic reverts to Study Mode before returning to Verify Mode.

5. The system of claim 1 wherein when said logic is in said Verify Mode, at least some of said multiplicity of registers are continuously hashed and compared, thereby to provide content verification outputs.

6. The system of claim 1 wherein if the reference and second hashes are not equal, the content verification output comprises a flag/interrupt raised to firmware which is operative to warn higher levels of software that the system incorporating the integrated circuit may be under hacking attack.

7. The system of claim 1 wherein said first hash and said second hash are each computed over a respective set of registers which includes plural registers.

8. The system of claim 7 wherein the integrated circuit includes one or more register files, and wherein each of said hashes is computed over all registers in a given register file.

9. The system of claim 7 wherein the integrated circuit includes one or more register banks, and wherein each of said hashes is computed over all registers in a given register bank.

10. The system of claim 1, the system further comprising an integrated circuit including a multiplicity of registers; and wherein said register content verification logic is deployed aboard said integrated circuit.

11. The system of claim 10 wherein the integrated circuit includes a processor having a first entry point including a first command to be executed after reset, and wherein, if the reference hash and the second hash are not equal, the content verification output triggers a hardware reset signal which causes said processor to revert to said first entry point.

12. The system of claim 1 wherein said logic is implemented in hardware residing on said integrated circuit.

13. A method for verifying integrity of content, the method comprising:
   providing register content verification logic configured for:
      when in a Study Mode, reading content from at least some of a multiplicity of registers, in an integrated circuit including at least one memory and a multiplicity of registers, wherein at least some of the multiplicity of registers configure and control the integrated circuit, for computing a first hash on said content, and for storing said first hash thereby to provide an up-to-date reference hash, and, at least once, when in a Verify Mode, verifying the integrity of at least some of the integrated circuit's registers by computing at least one second hash on said content, for comparing said at least one second hash to said reference hash and, accordingly, for providing a content verification output indicative of whether said reference hash and said at least one second hash are equal, wherein each time the reference and second hashes are not equal, the content verification output causes at least one action to be performed by being received by at least one of:

firmware which, responsively, triggers said least one action; and hardware which performs said least one action, wherein said action comprises halting a device incorporating the integrated circuit until the device has been powered off and switched back on.

14. The method of claim 13 wherein said reference hash comprises a digest previously computed at a time t by digesting the contents present in at least one register at time t.

15. The method of claim 14 wherein said at least one register comprises at least one register file.

16. The method of claim 14 wherein said digest comprises a hash.

* * * * *

UNITED STATES PATENT AND TRADEMARK OFFICE
CERTIFICATE OF CORRECTION

| | |
|---|---|
| PATENT NO. | : 11,386,234 B2 |
| APPLICATION NO. | : 16/717473 |
| DATED | : July 12, 2022 |
| INVENTOR(S) | : Ilan Margalit |

It is certified that error appears in the above-identified patent and that said Letters Patent is hereby corrected as shown below:

In the Claims

At Column 13, Claim 1, Line 62 should read as follows:
"registers for computing at least one second hash on" should be --registers by computing at least one second hash on--

Signed and Sealed this
Twenty-seventh Day of December, 2022

*Katherine Kelly Vidal*

Katherine Kelly Vidal
*Director of the United States Patent and Trademark Office*